Feb. 26, 1924.
E. A. SWEELEY
HATCH COVER
Original Filed Oct. 3, 1922
1,485,312
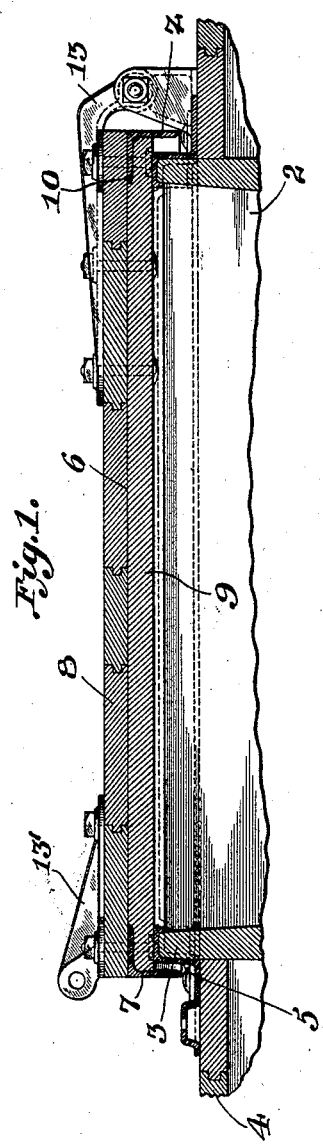
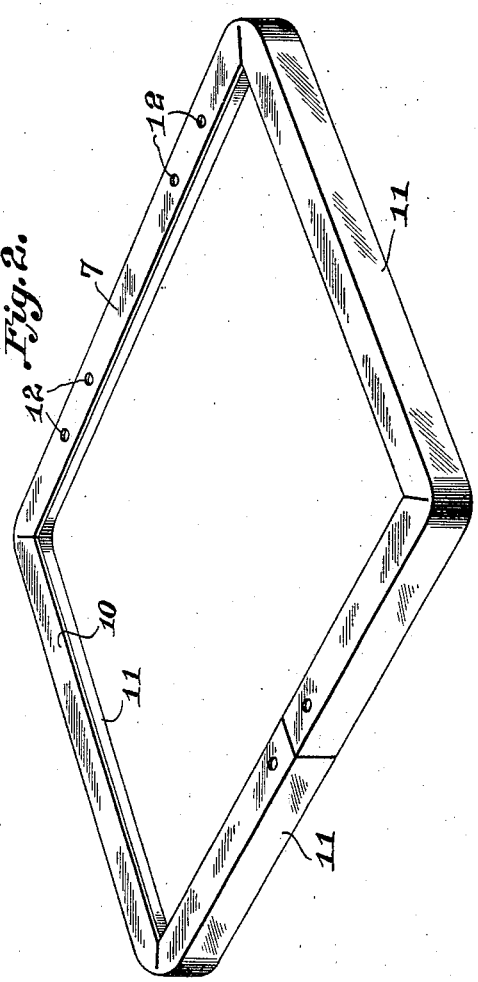
Inventor
Edward A. Sweeley
By Parker Cook
Attorney Patented Feb. 26, 1924.

1,485,312

UNITED STATES PATENT OFFICE.

EDWARD A. SWEELEY, OF ALEXANDRIA, VIRGINIA, ASSIGNOR TO THE WINE RAILWAY APPLIANCE COMPANY, OF TOLEDO, OHIO, A CORPORATION OF OHIO.

HATCH COVER.

Original application filed October 3, 1922, Serial No. 592,060. Divided and this application filed June 1, 1923. Serial No. 642,819.

*To all whom it may concern:*

Be it known that I, EDWARD A. SWEELEY, a citizen of the United States of America, residing at Alexandria, State of Virginia, have invented certain new and useful Improvements in Hatch Covers, of which the following is a specification.

My invention relates to new and useful improvements in hatch covers that are especially adapted for freight cars of the refrigerator type, and the present application is a division of my former application, entitled "Hatch covers and means for locking the same", patented November 13, 1923, No. 1,473,655.

The present divisional application relates especially to the hatch cover and the way it is constructed, and has for an object to provide a cover which will be relatively strong in construction, relatively light in weight, and relatively cheap to manufacture.

Another one of the objects of the invention is to provide a hatch cover wherein the wood portion of the cover will seat on the metal frame surrounding the hatch thereby providing a tighter fit than were the contacts metal to metal, and also thus providing a better insulated arrangement.

Still another object of the invention is to provide a hatch cover consisting primarily of two layers of wood and a frame made from a common form of angle iron which is easily procurable in the open market, which frame is designed to encircle the frame around the hatch and at the same time extend inwardly a slight distance between the two layers of wood to thereby greatly strengthen the hatch cover as a whole and at the same time allow the wood of the hatch cover to contact with the metal frame surrounding the hatch, thus forming a tight seat and allowing for any irregularities which may be present in the metal rim around the hatch.

With these and other objects in view, the invention consists in certain new and useful improvements and combinations of parts as will be hereinafter more fully described and pointed out in the claims.

Referring now to the drawing showing a preferred embodiment of my invention,

Fig. 1 is a sectional view of a hatch and the hatch cover in its closed position, and Fig. 2 is a perspective of the frame which forms a part of the hatch cover.

At the outset, it might be stated that Fig. 1 is similar to Fig. 1 of the parent application, with the exception that parts of the same have been removed.

In Fig. 1 there is shown a hatch 2 having the walls 3 extending above a car roof 4 while tightly fitting over this wall is the hatch frame 5 which forms the subject matter of another divisional application filed June 1, 1923, Serial No. 642,818. The hatch cover 6 comprises the metal frame 7, and an upper and lower layer of wood 8 and 9: these layers being preferably tongue and groove formation and extending in opposite directions as may be clearly seen from the drawing.

The frame 7 is of angle iron construction having the one leg 10 extending inwardly and its other leg 11 extending downwardly, the leg 10 fitting between the two layers of wood 8 and 9 as clearly shown in Fig. 1; a small seat being cut out in the upper surface of the under layer of wood 9 so that the leg 10 may seat properly. As is shown in Fig. 2, a sufficient length of angle iron may be employed, and at the corners where the bends will occur, a small V-shaped portion in the leg 10 may be removed, so that the same may be compressed and bent rectangularly. Holes 12 are provided in the upper leg 10 at the rear of the frame so that the hinges 13 may be bolted through the separate layers of wood 8 and 9 and through the leg 10 of the frame, and in a like manner, holes are provided at the front of the frame so that the bracket 13' may likewise be secured to the hatch cover, the bolt passing through the frame and separate layers of wood, thereby tying the several parts in position and strengthening the hatch cover.

Although not shown, it will be understood that if necessary, other bolts may be used to fasten the wood to the frame. In Fig. 1, the distance between the frame 5 and the leg 11 of the frame 7 is slightly exaggerated for the sake of clearness, but it will be understood that this distance is just enough to allow the hatch cover to be freely raised and lowered into position.

From the foregoing, it will be seen that a hatch cover of this type is greatly superior to a hatch of all metal as it will not radiate the heat or cold, as will the former, while furthermore, the hatch cover may be tightly drawn on its seat and will present a wood surface to the frame 5, thus allowing for any irregularities in the metal seat 5, and forming a much tighter joint, and also a better insulated one.

It is also superior to an all wooden hatch on account of the rigidity obtained by the metal frame.

Again, the cover is one which may be easily assembled, relatively cheap to manufacture, and rigid in construction.

Many slight changes might be made without in any way departing from the spirit and scope of the invention.

Having thus described my invention, what I claim as new and desire to secure by Letters Patent is:—

1. A hatch cover comprising a body made of a plurality of layers of wood, a metal rim, having one leg thereof extending between two layers of wood and the other leg extending downwardly below the plane of the undermost layer of wood, the latter leg of the rim adapted to enclose the walls of a hatch when the cover is in its closed position and the rim forming a frame to which both layers of wood are secured.

2. A hatch cover comprising a metal frame, the said frame having an inwardly extending flange, a layer of heat insulating material secured on the flange of the frame and a second layer of heat insulating material secured to the under surface of said flange of the frame, a portion of said frame extending below the plane of the bottom surface of said lower heat insulating material.

3. In combination with a hatch having a metal rim around its upper edge, a hatch cover comprising a metal frame, said frame having upright and horizontal extending portions, a layer of heat insulating material secured to the horizontal portion of the frame and on its upper surface, and a further layer of heat insulating material secured to the under surface of the horizontal portion of the frame, the upright portion of the frame extending below the second layer of heat insulating material and adapted to encircle the walls of the hatch when the cover is in a closed position and the rim around the hatch contacting with a heat insulating portion of the hatch cover.

4. In combination with a hatch having a metal rim around its edge, a hatch cover comprising a metal frame formed of angle iron, a layer of heat insulating material secured to one leg of the frame and on the upper surface of said leg, and a second layer of heat insulating material secured to the same leg and to the under surface thereof, one leg of the frame extending downwardly below the lower layer of the heat insulating material and adapted to encircle the metal frame on the hatch, and the metal frame of the hatch adapted to contact with a heat insulating portion of the hatch cover when the latter is in its closed position, the one leg of the metal frame being directly above the metal frame of the hatch.

5. In combination with a hatch having a metal rim around its edges, a hatch cover the body of which comprises two layers of oppositely disposed wooden strips, a metal frame disposed between the two said layers enclosing the lower of said layers and extending downwardly below the surface thereof and adapted to enclose the metal rim of the hatch. and the metal rim of the hatch seating against the lower layer of the wood of the body portion of the hatch cover to thereby provide a tight and insulated joint.

In testimony whereof I affix my signature.

EDWARD A. SWEELEY.